(12) United States Patent
Saito (10) Patent No.: US 9,437,349 B2
(45) Date of Patent: Sep. 6, 2016

(54) WATERPROOFING STRUCTURE AND WATERPROOFING METHOD IN CORE WIRE

(71) Applicant: Yazaki Corporation, Minato-ku, Tokyo (JP)

(72) Inventor: Takahiro Saito, Kosai (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 116 days.

(21) Appl. No.: 14/354,638

(22) PCT Filed: Oct. 26, 2012

(86) PCT No.: PCT/JP2012/078411
§ 371 (c)(1),
(2) Date: Apr. 28, 2014

(87) PCT Pub. No.: WO2013/062143
PCT Pub. Date: May 2, 2013

(65) Prior Publication Data
US 2014/0299353 A1    Oct. 9, 2014

(30) Foreign Application Priority Data

Oct. 28, 2011   (JP) .................................. 2011-237658

(51) Int. Cl.
*H01B 7/282*        (2006.01)
*H01B 13/06*        (2006.01)
(Continued)

(52) U.S. Cl.
CPC .............. *H01B 7/282* (2013.01); *H01B 7/285* (2013.01); *H01B 13/06* (2013.01); *H01R 4/70* (2013.01); *Y10T 29/49194* (2015.01)

(58) Field of Classification Search
CPC ............................... H01B 7/282; H01B 13/06
USPC ............................. 174/113 R, 77 R; 29/868
See application file for complete search history.

(56) References Cited

U.S. PATENT DOCUMENTS 4,095,039 A      6/1978   Thompson
4,461,736 A  *   7/1984   Takagi .................... B29C 44/12
                                                            156/48
(Continued)

FOREIGN PATENT DOCUMENTS

CN       1260620 A    7/2000
DE       3822543 A1   1/1990
(Continued)

OTHER PUBLICATIONS

International Preliminary Report on Patentability issued in corresponding International Application No. PCT/JP2012/078411 mailed Apr. 29, 2014.

(Continued)

Primary Examiner — Timothy Thompson
Assistant Examiner — Charles Pizzuto
(74) Attorney, Agent, or Firm — Banner & Witcoff, Ltd.

(57) ABSTRACT

A waterproofing structure in a core wire includes a covered electric wire in which a plurality of core wires are covered with an insulating covering, a core wire bundle expanded portion in which the core wires of an intermediate core wire exposed portion are separated from each other and expanded in diameter by removing a part of the insulating covering, and a mold portion that is molded to surround the core wire bundle expanded portion by cooling and solidifying a thermoplastic adhesive filling between the core wires in the core wire bundle expanded portion by hot melting, together with the insulating coverings at both sides between which the intermediate core wire exposed portion is interposed.

3 Claims, 6 Drawing Sheets (51) Int. Cl.
*H01B 7/285* (2006.01)
*H01R 4/70* (2006.01)

(56) References Cited

U.S. PATENT DOCUMENTS

| | | | | |
|---|---|---|---|---|
| 4,881,995 | A | * 11/1989 | Arenz | H01R 4/72 156/229 |
| 5,846,467 | A | 12/1998 | Saito et al. | |
| 6,107,573 | A | * 8/2000 | Uchiyama | H01R 4/22 174/75 R |
| 6,158,113 | A | 12/2000 | Saito et al. | |
| 6,438,828 | B1 | 8/2002 | Uchiyama | |
| 6,785,958 | B1 | 9/2004 | Saito et al. | |
| 6,967,287 | B2 | * 11/2005 | Ide | H01B 7/28 174/84 R |
| 7,850,806 | B2 | * 12/2010 | Kawakita | H01R 4/72 156/47 |
| 8,403,690 | B2 | 3/2013 | Sawamura | |
| 2011/0045697 | A1 | * 2/2011 | Sawamura | B60R 16/0207 439/587 |

FOREIGN PATENT DOCUMENTS

| | | | | |
|---|---|---|---|---|
| DE | 3903059 A1 | * | 8/1990 | |
| DE | 102005022937 A1 | | 11/2006 | |
| GB | 1323696 | * | 7/1973 | .......... H02G 15/085 |
| JP | 02250617 | * | 10/1990 | |
| JP | H07-320799 A | | 12/1995 | |
| JP | H08-340619 A | | 12/1996 | |
| JP | 63284780 | * | 11/1998 | |
| JP | H11-27833 A | | 1/1999 | |
| JP | 2005032621 A | | 2/2005 | |
| JP | 2007-052999 A | | 3/2007 | |
| JP | 2007-141517 A | | 6/2007 | |
| JP | 2009-071980 A | | 4/2009 | |
| JP | 2009-272188 A | | 11/2009 | |
| JP | 2011-119038 A | | 6/2011 | |
| JP | 4794988 | * | 10/2011 | |

OTHER PUBLICATIONS

Search Report issued in corresponding International Application No. PCT/JP2012/078411 mailed Apr. 3, 2013.

Written Opinion issued in corresponding International Application No. PCT/JP2012/078411 mailed Apr. 3, 2013.

Oct. 13, 2015—(JP) Notification of Reasons for Refusal—App 2011-237658.

Aug. 5, 2015—(CN) Notification of the First Office Action—App 201280053152.7.

* cited by examiner

WATERPROOFING STRUCTURE AND WATERPROOFING METHOD IN CORE WIRE

TECHNICAL FIELD

The present invention relates to a waterproofing structure in a core wire and a waterproofing method in a core wire that prevent water from entering the inside of a covered electric wire.

BACKGROUND ART

In a case where, for example, a ground terminal press-clamped to an electric wire is connected to a vehicle body that is in a water-coverable area, water may enter the electric wire from the exposed core wire press-clamped to the ground terminal and may enter a device and an appliance that are connected to the opposite end of the electric wire. In order to prevent water from entering through such a course, in some cases, a waterproofing process is performed on a terminal crimp part or a water sealing process is performed on the core wire of the electric wire midsection.

Figure 5A:
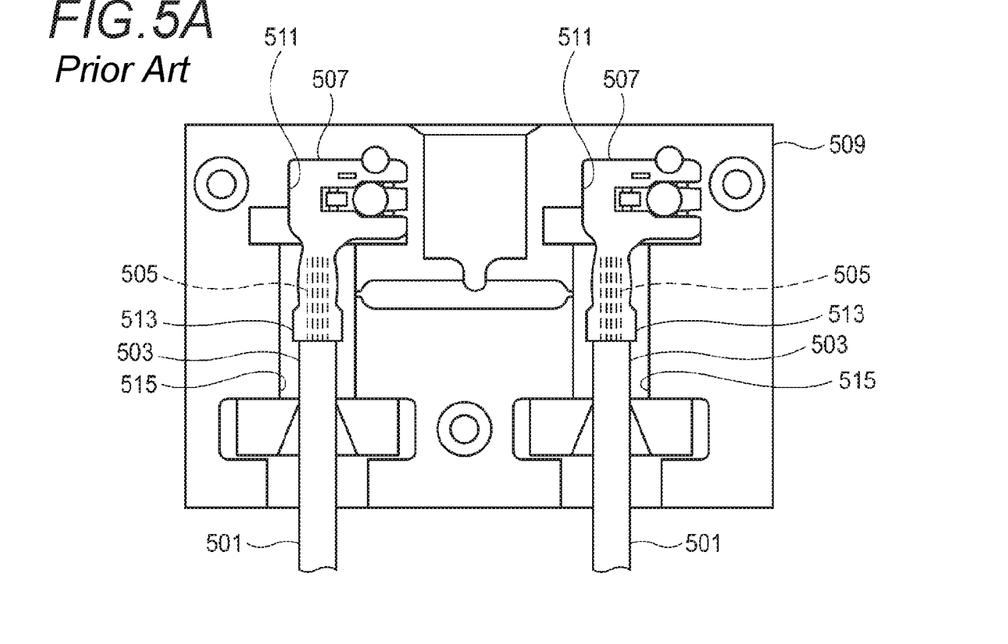
FIG. 5A is a plan view of the metal mold which accommodates the terminal crimp part.
Figure 5B:
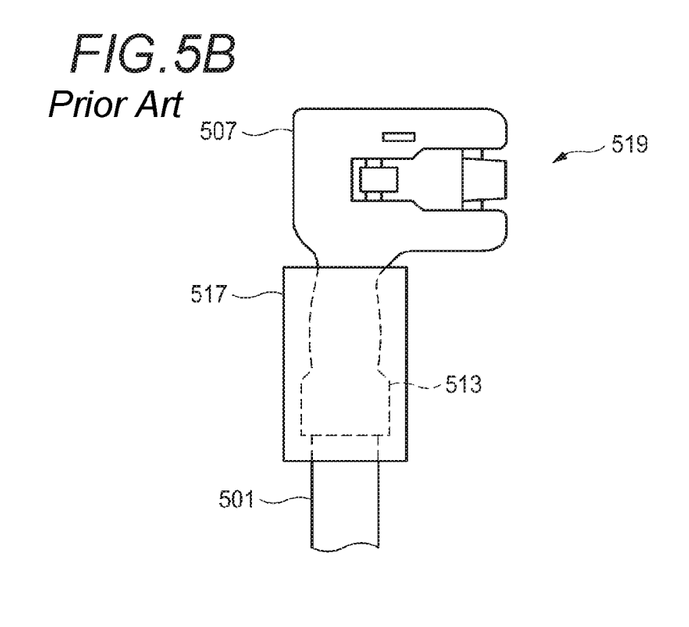
FIG. 5B is a plan view of a crimp part mold electric wire in a related art that is subjected to the waterproof processing by the metal mold of FIG. 5A.

In the waterproofing process of the terminal crimp part, as shown in FIG. 5A, a terminal 507 is crimped to core wires 505 exposed on an end portion 503 of a covered electric wire 501, and the terminal 507 connected to the covered electric wire 501 is set and clamped to a terminal accommodation portion 511 of a metal mold 509. In the metal mold, a terminal crimp part 513, and a part of the covered electric wire 501 that is led therefrom are placed in an injection molding space 515. When demolding after performing the injection molding by pouring a resin material into the injection molding space 515, as shown in FIG. 5B, the terminal crimp part 513 is integrated with the covered electric wire 501, and thus it is possible to provide an electric wire 519 with molded crimp part that is covered with a mold portion 517 (for example, see Patent Literature 1).

Figure 6:
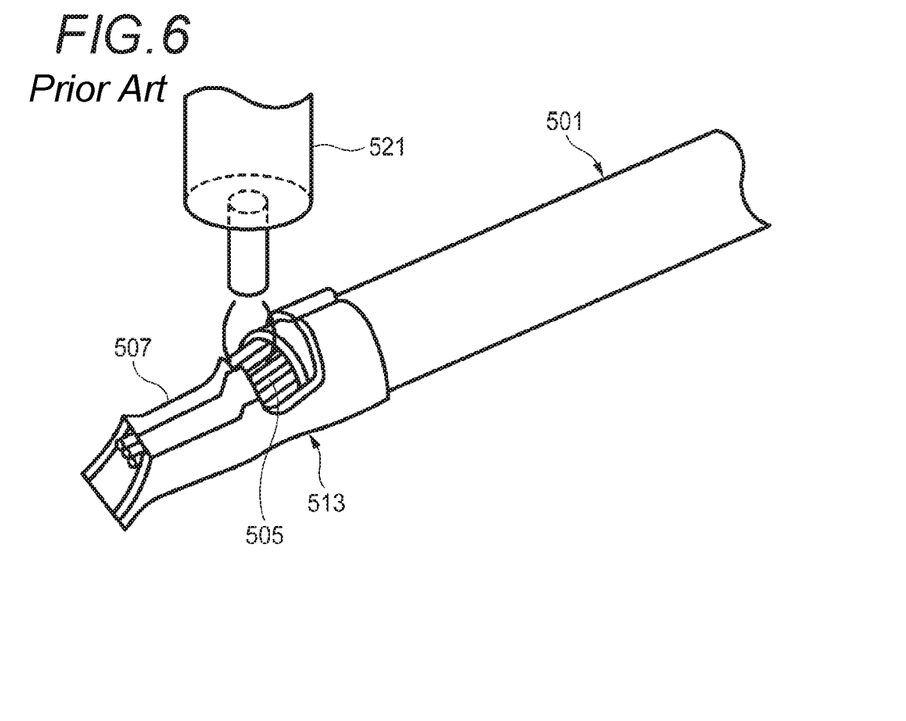
FIG. 6 is a perspective view that illustrates a waterproof processing structure of a related art which drops a low-viscosity material onto the terminal crimp part.

Furthermore, as shown in FIG. 6, the waterproofing process is also performed by dripping a low-viscosity material 521 on the terminal crimp part 513.

Figure 7:
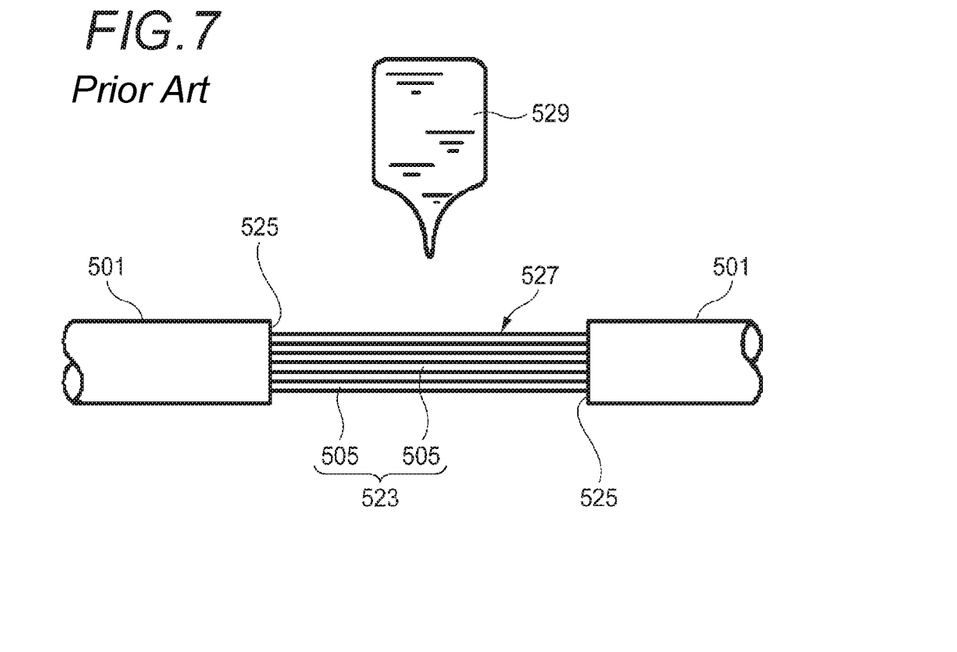
FIG. 7 is a side view that illustrates a waterproof processing structure of a related art relative to the core wire of the electric wire midsection.

Furthermore, as shown in FIG. 7, in the waterproof processing of the core wire 505 of an electric wire midsection 523, a slit is formed along an entire periphery of an insulating covering 525, one insulating covering 525 is stretched and moved to one side with the slit interposed therebetween (so-called push to the side), and the core wire 505 are exposed. The core wire exposed portion 527 is filled with a water sealing agent 529 of low viscosity such as a liquefied silicone resin or a cyanoacrylate having the required viscosity, and a waterproof sheet coated with an adhesive is wound and fixed (for example, see Patent Literature 2). Furthermore, there is also a case where a thermal contraction tube is covered from the outer periphery of the core wire exposed portion 527 toward outer peripheries of the insulating coverings 525 at both sides of the core wire exposed portion 527 (for example, see Patent Literature 3).

CITATION LIST

Patent Literature

Patent Literature 1: JP-A-2009-71980
Patent Literature 2: JP-A-2009-272188
Patent Literature 3: JP-A-2011-119038

SUMMARY OF INVENTION

Technical Problem

However, according to the waterproofing method of preventing water from entering by molding the terminal crimp part 513, since the shape of the terminal 507 which is a target of the waterproof processing is limited by the terminal accommodation portion 511 of the metal mold 509, it is impossible to cope with the different terminal shapes. Furthermore, there is a need to secure the covering thickness due to the mold in order to obtain stable performance such as absorbing deviation of the crimp dimension, and as a result, the mold portion 517 increases in size. If the mold portion 517 increases in size, cases where the electric wire 519 with molded crimp part is mounted in a vehicle are limited.

Furthermore, according to the waterproofing method of dripping a low-viscosity material 521 onto the terminal crimp part 513, since a very small amount of low-viscosity material 521 is dripped onto the terminal crimp part 513 and filled the terminal crimp part 513, stable waterproof performance is not obtained due to drooping, a lack of material or the like. In addition, when filling with the low-viscosity material 521, there is a case where auxiliary processing such as compression and decompression is required.

Furthermore, according to the water sealing processing that fills the core wires 505 of the electric wire midsection 523 with the low viscosity water sealing agent 529, there is a problem that the water sealing agent 529 is not directly dried but is attached to other components after the filling to lower the quality. In addition, when using the low viscosity water sealing agent 529, there is a need for a complex viscosity management such as viscosity measurement.

The present invention is made in view of the above circumstances, and an object thereof is to provide a waterproofing structure and a waterproofing method in a core wire in which a compact water sealing processing is performed without being influenced by the type of terminal, the degree of freedom of the water sealing processing position is improved, and there is no need for attachment to other components or the complex viscosity management due to the use of the low-viscosity liquefied material.

Solution to Problem

Aspects of the present invention include the following configurations.

(1) A waterproofing structure in a core wire, including: a covered electric wire in which a plurality of core wires are covered with an insulating covering; a core wire bundle expanded portion in which the core wires of an intermediate core wire exposed portion are separated from each other and expanded in diameter by removing a part of the insulating covering; and a mold portion that is molded to surround the core wire bundle expanded portion by cooling and solidifying a thermoplastic adhesive filling between the core wires in the core wire bundle expanded portion by hot melting, together with the insulating coverings at both sides between which the intermediate core wire exposed portion is interposed.

According to the waterproofing structure in core wire of the configuration (1) mentioned above, in the intermediate portion of the covered electric wire in a longitudinal direction, the insulating covering is removed, and the exposed core wires become a core wire bundle expanded portion of a rough state where the core wires are separated and expanded in diameter from the condensed bundle state to form a gap. Since the core wires of the core wire bundle expanded portion become merely the rough state from the condensed bundle state, the diameter of the core wires is not so increased. The gap between the core wires is filled with a hot-molten thermoplastic adhesive. Moreover, the thermoplastic adhesive subjected to the cooling solidification in the molding metal mold becomes a mold portion that has a predetermined outline shape. That is, it is possible to mold the mold portion in a certain position of the covered electric wire without being limited to the terminal shape.

Furthermore, the mold portion is filled in the gap between the core wires and is also molded to cover the insulating coverings at both sides between which the intermediate core wire exposed portion is interposed. That is, the solidified thermoplastic adhesive stops water between the entire core wires and also stops water between the core wire bundle and the insulating covering. Thus, high waterproofing performance is provided by a simple structure, for example, compared to the structure of the related art in which the intermediate core wire exposed portion is filled with the water sealing agent of low viscosity and the outer periphery thereof is covered with the thermal contraction tube.

(2) The waterproofing structure in the core wire according to the configuration (1), wherein the mold portion has a cylindrical shape.

According to the waterproofing structure in core wire of the configuration (2) mentioned above, when the covered electric wire penetrates a partition member that partitions a water-coverable area, waterproofing between an electric wire penetration hole of the partition member and the mold portion is easily performed by an outer peripheral surface of the mold portion that is formed in a cylindrical shape. That is, an O ring and a grommet are easily used. Thus, if the waterproof is performed between the electric wire penetration hole of the partition member and the mold portion, it is possible to completely prevent water from entering from the water-coverable area by a simple waterproof structure.

The waterproofing structure may be configured so that the core wires in the core wire bundle expanded portion are twisted.

(3) A waterproofing method in a core wire, including: removing a part of an insulating covering of a covered electric wire in which a plurality of core wires is covered with the insulating covering, thereby forming an intermediate core wire exposed portion; fixing the covered electric wire at one end side and twisting the covered electric wire at the other end side in a first direction and returning the covered electric wire in a second direction opposite to the first direction to separate the bundled core wires from each other and expanded in diameter, thereby forming a core wire bundle expanded portion, wherein the intermediate core wire exposed portion is interposed between the covered electric wire at the one end side and the other end side; setting the core wire bundle expanded portion together with the insulating coverings at both sides between which the core wire bundle expanded portion is interposed; and then pouring a hot-molten thermoplastic adhesive into the molding metal mold and filling with the thermoplastic adhesive in a gap between the core wires in the core wire bundle expanded portion, thereby molding a mold portion surrounding the core wire bundle expanded portion, together with the insulating coverings at both sides between which the core wire bundle expanded portion is interposed.

According to the waterproofing method in core wire of the configuration (3) mentioned above, in the intermediate portion of the covered electric wire in the longitudinal direction, the insulating covering is removed, the core wires of the exposed condensed bundle state is unwound by being twisted in first and second (forward and reverse) directions, and a core wire bundle expanded portion is provided in which a gap is formed between the core wires. The core wire bundle expanded portion is placed and clamped in the injection molding space of the molding metal mold together with the covered electric wires at both sides. The thermoplastic adhesive subjected to the hot melting through high temperatures is poured into the injection molding space. The poured liquefied thermoplastic adhesive fills the gap between the entire core wires, and covers the insulating coverings at both sides between which the core wire bundle expanded portion is interposed and performs the cooling solidification thereof. Since the mold portion is formed by injection molding in which the thermoplastic adhesive is poured into the injection molding space, there is also no need for a viscosity management such as attachment to other members and complex viscosity measurement. As a result, the mold portion is provided in which the thermoplastic adhesive fills the gap between the core wires is integrated with the insulating coverings at both sides. That is, the mold portion is provided in which both the ingress of water from between the core wires and the entrance of water from between the core wire bundle and the insulating covering is prevented.

Advantageous Effects of Invention

According to the waterproofing structure in core wire and the waterproofing method in core wire according to the aspects of the present invention, since compact water sealing processing is performed without being influenced by the type of the terminal, the degree of freedom of the water sealing processing position is improved, and the low-viscosity liquefied material is not used, viscosity management such as attachment to other members and complex viscosity management cannot be required.

As mentioned above, the aspects of the present invention has been clearly described. Additionally, the present invention is more clearly and sufficiently read from the description of the mode for carrying out the invention (hereinafter, referred to as an "embodiment") mentioned below.

BRIEF DESCRIPTION OF DRAWINGS

In FIG. 3, (a) is a side view of a covered electric wire in which an insulating covering is removed and an intermediate core wire exposed portion is formed, (b) is a side view of the covered electric wire in which one end side is twisted between which the intermediate core wire exposed portion is interposed, and (c) is a side view of the covered electric wire in which one end side returns in an original direction and a core wire bundle expanded portion is formed.

DESCRIPTION OF EMBODIMENTS

Hereinafter, an embodiment of the present invention will be described with reference to the drawings.

The waterproofing structure in a core wire according to the present embodiment is applied to a covered electric wire 11 with a molded intermediate core wire. The covered electric wire 11 with the molded intermediate core wire can be preferably used when preventing water from entering inside the electric wire from the exposed core wire of the covered electric wire 13 that is in the water-coverable area, and preventing water from entering the device and the appliance connected to the opposite end of the covered electric wire 13. In addition, although the water sealing in the present specification is described as an example of water, the present invention effectively acts on all liquids other than water, including oil, alcohol and the like.

Figure 1:
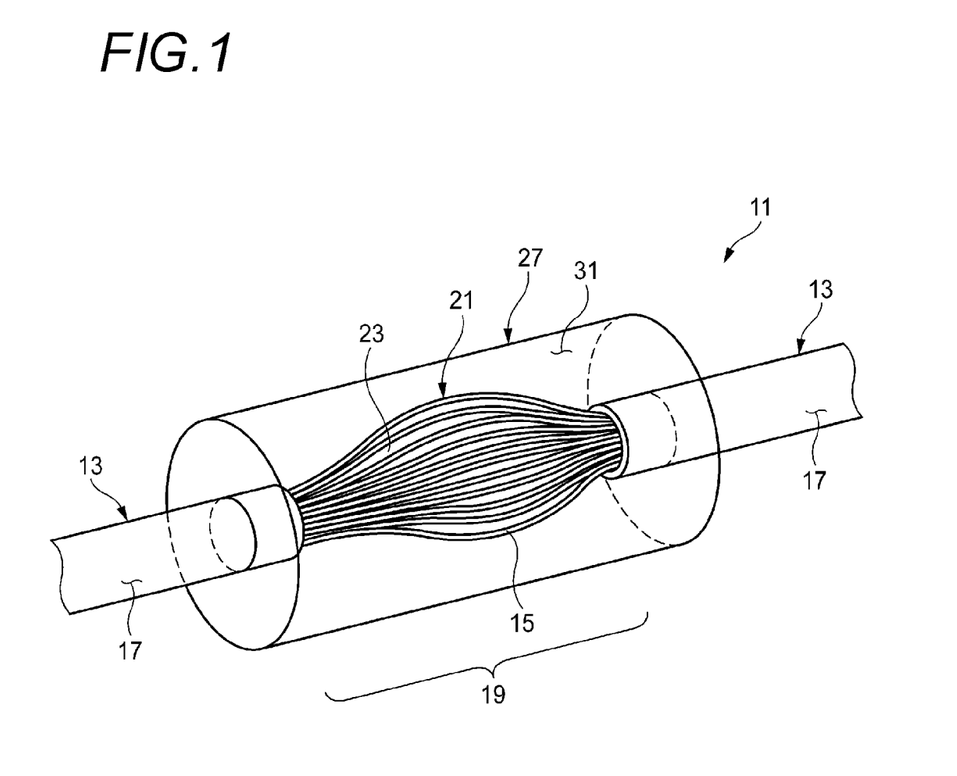
FIG. 1 is a schematic perspective view that illustrates a waterproofing structure in a core wire according to an embodiment of the present invention.
Figure 2:
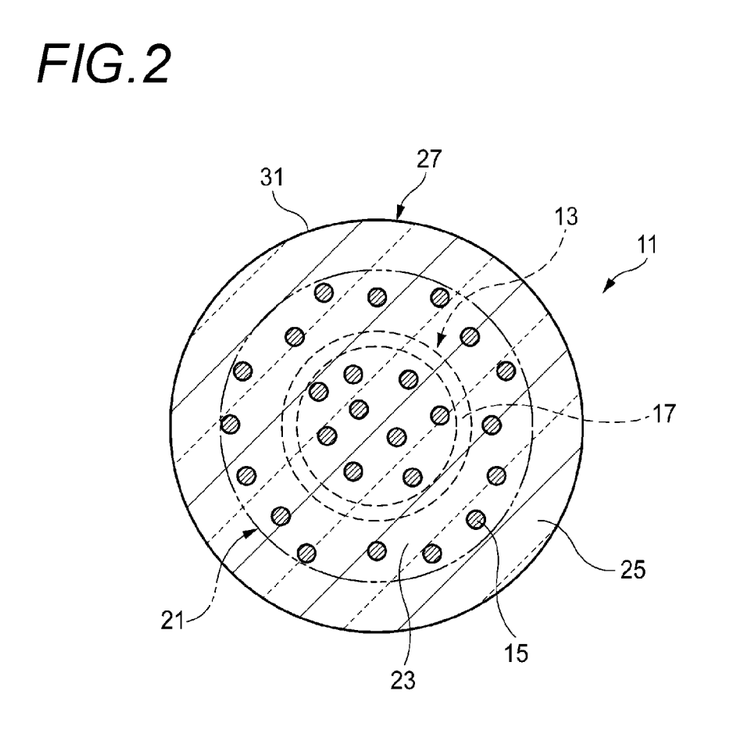
FIG. 2 is a transverse cross-sectional view of a mold portion illustrated in FIG. 1 in a direction perpendicular to an axis of a covered electric wire.
Figure 3:
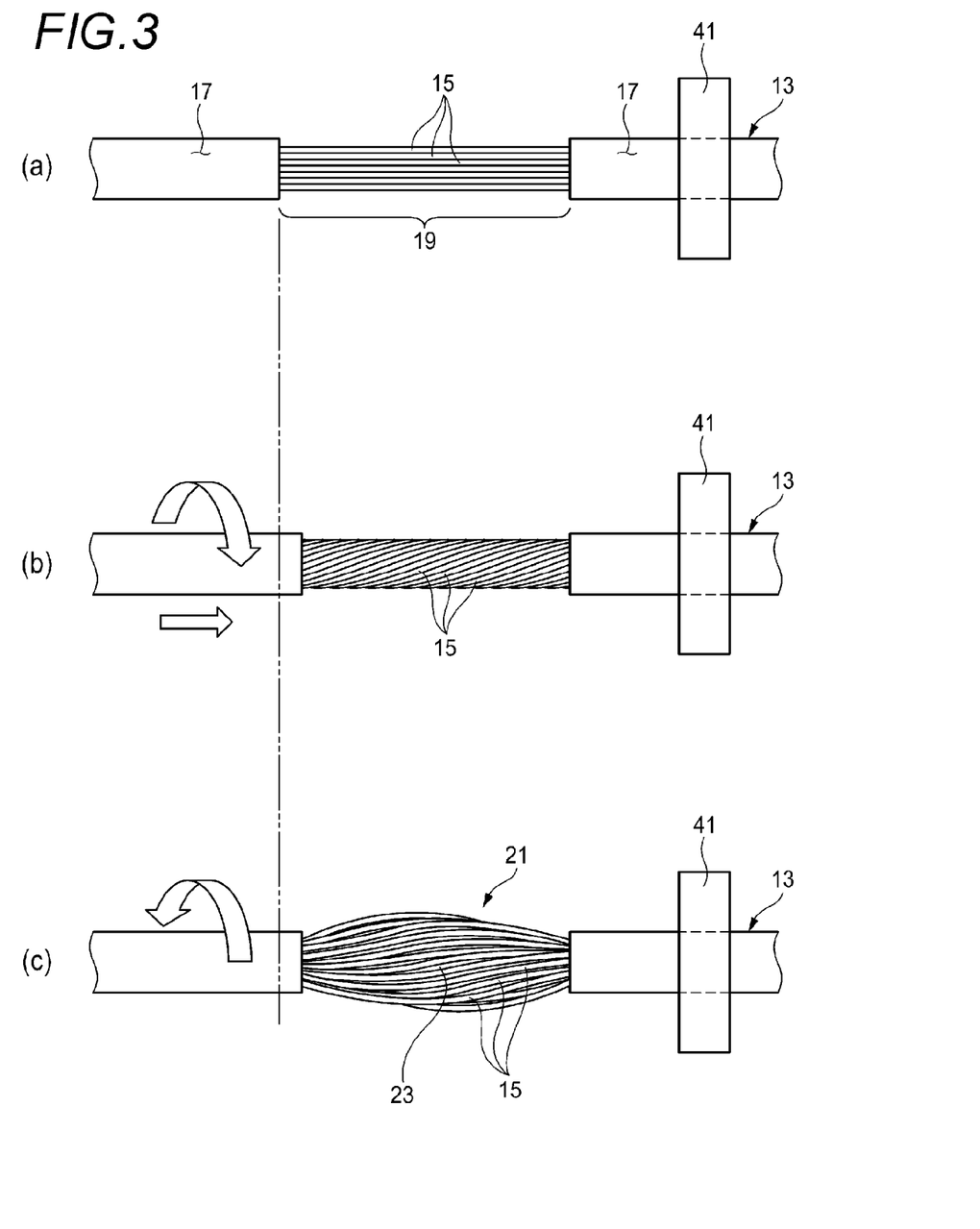

As shown in FIGS. 1 to 3, the covered electric wire 13 is configured so that a plurality of core wires 15 is covered with an insulating covering 17. The core wire 15 refers to a linear conductor, such as copper or aluminum. The core wire 15 is in a bundle state where the plurality of wires is condensed in parallel. In the intermediate portion of the covered electric wire 13 in the longitudinal direction, an intermediate core wire exposed portion 19 is formed in which the insulating covering 17 is removed by a predetermined length. The intermediate core wire exposed portion 19 is formed by causing a pair of slits to enter along the entire periphery of the insulating covering 17 and causing a notch to enter from one slit toward the other slit in the electric wire longitudinal direction to remove the insulating covering 17 between the pair of slits.

As shown in FIGS. 1 and 2, in the intermediate core wire exposed portion 19, the exposed core wires 15 are separated from each other and expanded in diameter, and a core wire bundle expanded portion 21 of a rough bundle with a large outer diameter is formed. In the gap 23 between the core wires in the core wire bundle expanded portion 21, a mold portion 27 is molded which is molded to surround the core wire bundle expanded portion 21 by the cooling solidification of the thermoplastic adhesive 25 filling by hot melting, together with the insulating coverings 17 at both sides between which the intermediate core wire exposed portion 19 is interposed.

The thermoplastic adhesive 25 is an adhesive with a solid content that is also referred to as a hot-melt adhesive, which is an organic solvent-free solid adhesive containing a thermoplastic resin as a main ingredient. The thermoplastic adhesive 25 becomes a solid at room temperature. In a state of the hot melting and the liquefied phase, the injection molding using a molding metal mold mentioned below is possible, and the adhesive is solidified by the cooling and the bonding is completed. After solidification, the flexibility, tolerance to moisture, and tolerance to grease are excellent.

Furthermore, the thermoplastic adhesive 25 of the present embodiment becomes transparent when cooled and solidified. Accordingly, the filling state of the gap 23 is visible. As a result, the presence or absence of a mold cavity immediately after molding the mold portion 27, and the presence or absence of the ingress of water after use for a long period of time are also visible. Of course, using an adhesive which becomes opaque when cooled and solidified, or a thermoplastic adhesive with a coloring agent added is also possible.

Furthermore, the mold portion 27 of the present embodiment is formed in a cylindrical shape. Since the mold portion 27 is molded by injection molding, an outer peripheral surface 31 thereof becomes a smooth cylindrical surface. As a result, the mold portion is able to be used as a waterproof surface relative to a grommet and an O ring. That is, the mold portion 27 is inserted into the grommet as it is, or the O ring is mounted to the outer periphery, and thus, for example, it is possible to simply provide a waterproof structure between the mold portion and the partition member that partitions the water-coverable area.

Next, an operation of the waterproofing structure in core wire mentioned above will be described.

In the waterproofing structure in core wire according to the present embodiment, in the intermediate portion of the covered electric wire 13 in the longitudinal direction, the insulating covering 17 is removed, and the exposed core wire 15 becomes the core wire bundle expanded portion 21 of the rough state in which the core wires 15 are separated and expanded in diameter from the condensed bundle state so as to form the gap 23.

The core wire 15 of the core wire bundle expanded portion 21 merely becomes the rough state from the condensed bundle state, and thus the diameter thereof is not so increased. The gap 23 between the core wires 15 is filled with the thermoplastic adhesive 25 which is subjected to the hot-melting and is press-clamped. Moreover, the thermoplastic adhesive 25 cooled and solidified in the molding metal mold (see FIG. 4) becomes a mold portion 27 that has a predetermined outline shape. That is, the mold portion 27 can be molded at a certain position of the covered electric wire 13 without being limited to the terminal shape.

Furthermore, the mold portion 27 is filled to the gap 23 between the core wires 15, and is also molded to cover the insulating coverings 17 at both sides between which the intermediate core wire exposed portion 19 is interposed. That is, the solidified thermoplastic adhesive 25 stops water between all of the core wires 15 and also stops water between the core wire bundle and the insulating covering 17. Thus, for example, compared to the structure of the related art in which the intermediate core wire exposed portion 19 is filled with the water sealing agent of low viscosity and the outer periphery thereof is covered with the thermal contraction tube, in the waterproofing structure in core wire according to the present embodiment, high waterproof performance is provided by a simple structure.

Additionally, for example, when the covered electric wire 13 penetrates the partition member that partitions the water-coverable area, waterproofing between the electric wire penetration hole of the partition member and the mold portion 27 is easily performed by the outer peripheral surface 31 of the mold portion 27 formed in a cylindrical shape. That is, an O ring and a grommet are easily used as the waterproof member. Moreover, if only between the electric wire penetration hole of the partition member and the mold portion 27 is waterproofed, it is possible to completely prevent the ingress of water from the water-coverable area by a simple waterproof structure.

Next, a waterproofing method in a core wire according to an embodiment of the present invention will be described with reference to FIGS. 3 and 4.

Firstly, as shown in (a) of FIG. 3, the intermediate core wire exposed portion 19 is formed by removing the insulating covering 17 of the covered electric wire 13 in which a plurality of core wires 15 is covered with the insulating covering 17.

Next, as shown in (b) of FIG. 3, the covered electric wire 13 of the other side (a left side in (b) of FIG. 3) is twisted in a state where the covered electric wire 13 at one end side (a right side in FIG. 3B) between which the intermediate core wire exposed portion 19 is interposed is fixed by the fixing member 41. At this time, the covered electric wire 13 of the other end side approaches the covered electric wire 13 of one end side.

After that, as shown in (c) of FIG. 3, the bundled core wires 15 are separated from each other and expanded in diameter by being twisted in an original direction at the same position to form the core wire bundle expanded portion 21.

Figure 4:
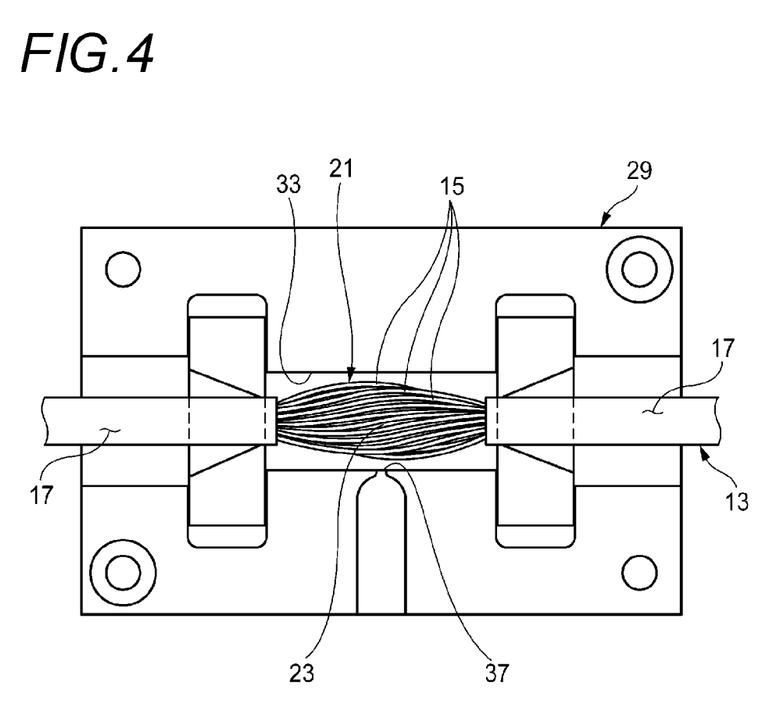
FIG. 4 is a plan view of the covered electric wire in which the core wire bundle expanded portion is placed in an injection molding space of a molding metal mold.

Next, as shown in FIG. 4, the covered electric wire 13 including the insulating coverings 17 at both sides between which the core wire bundle expanded portion 21 is interposed is set on a lower metal mold 29 of the molding metal mold to clamp an upper metal mold (not shown).

After that, by pouring the thermoplastic adhesive 25 into the injection molding space 33 from the gate 37, the thermoplastic adhesive 25 is poured into the gap 23 between the core wires 15 in the core wire bundle expanded portion 21. The thermoplastic adhesive 25 molds the mold portion 27 (see FIG. 1) that surrounds the core wire bundle expanded portion 21 including the insulating coverings 17 at both sides between which the core wire bundle expanded portion 21 is interposed. After the thermoplastic adhesive 25 is cooled and solidified, the molded covered electric wire 13 in which the mold portion 27 is formed is drawn from the molding metal mold, and the runner portion is removed, thereby completing the manufacturing of the covered electric wire 11 with the molded intermediate core wire (see FIG. 1) that becomes a product.

In the waterproofing method in core wire, in the intermediate portion of the covered electric wire 13 in the longitudinal direction, the insulating covering 17 is removed, the core wire 15 of the exposed and condensed bundle state is unwound by being twisted in the opposite direction, and becomes the core wire bundle expanded portion 21 formed with the gap 23 between the core wires 15. The core wire bundle expanded portion 21 is disposed at the injection molding space 33 of the molding metal mold to be clamped with the both side of covered electric wire 13. The thermoplastic adhesive 25 becoming the liquefied state through high temperatures is press-clamped into the injection molding space 33. The press-clamped liquefied thermoplastic adhesive 25 is completely filled in the gap 23, and also covers and solidifies the insulating coverings 17 at both sides between which the core wire bundle expanded portion 21 is interposed.

Since the mold portion 27 mentioned above is formed by the injection molding in which the thermoplastic adhesive 25 is poured into the injection molding space 33, there is no need for viscosity management such as attachment to other members and complex viscosity measurement. Thus, the mold portion 27 is provided in which the thermoplastic adhesive 25 fills the space 23 between the core wires 15 is integrated with the insulating coverings 17 at both sides. That is, the mold portion 27 is provided in which water is prevented from entering from between the core wires 15 and water is prevented from entering from between the core wire bundle and the insulating covering 17.

Accordingly, according to the waterproofing structure in core wire and the waterproofing method in core wire according to the present embodiment, the compact water sealing processing can be performed without being influenced by the type of the terminal, a degree of freedom of the water sealing processing position is improved, and the low-viscosity liquefied material is not used. Thus, the attachment of the low-viscosity liquefied material to the other members, and the complex viscosity management cannot be required.

In addition, the waterproofing structure in core wire and the waterproofing method in core wire according to the embodiment of the present invention are able to be suitably modified, improved or the like without being limited to the embodiment mentioned above. In addition, the material, the shapes, the dimensions, the numbers, the placement locations or the like of the respective components in the embodiment mentioned above are arbitrary as long as the present invention can be achieved, and are not limited.

For example, in the embodiment mentioned above, although the mold portion 27 is formed in a cylindrical shape, if there is no need to form the waterproof structure between the partition portion and the electric wire penetration hole of the partition member, it is needless to say that various shapes such as a polygonal shape and a rotation oval shape may be adopted.

Furthermore, in the embodiment mentioned above, in order to fill the gap 23 between the core wires 15 in the core wire bundle expanded portion 21 with the thermoplastic adhesive 25, although the hot-molten thermoplastic adhesive 25 is poured into the injection molding space 33 of the molding metal mold, the waterproofing structure in core wire and the waterproofing method in core wire of the present invention are not limited thereto. For example, the hot-molten thermoplastic adhesive 25 may be poured into the decompressed molding metal mold, or the hot-molten thermoplastic adhesive 25 may flow in the molding metal mold in which the core wire bundle expanded portion is set without the decompression.

The present application is based upon and claims the benefit of Japanese patent application No. 2011-237658 filed on Oct. 28, 2011, the contents of which are incorporated by reference in its entirety.

INDUSTRIAL APPLICABILITY

The present invention is useful to provide or route an electric wire, for example, in a water-coverable area of a vehicle body because the waterproofing structure and the waterproofing method in the core wire which are applied to the electric wire prevent water from entering the inside of the covered electric wire.

REFERENCE SIGNS LIST

13: covered electric wire
15: core wire
17: insulating covering
19: intermediate core wire exposed portion
21: core wire bundle expanded portion
23: gap
25: thermoplastic adhesive
27: mold portion
29: lower metal mold

The invention claimed is:

1. A waterproofing structure in a core wire, comprising:
a covered electric wire in which a plurality of core wires are covered with an insulating covering;

a core wire bundle expanded portion in which the core wires of an intermediate core wire exposed portion are separated from each other and expanded in diameter by removing a part of the insulating covering; and a cylindrical mold portion that is molded to surround the core wire bundle expanded portion, the cylindrical mold portion being a cooled and solidified thermoplastic adhesive filling between the core wires in the core wire bundle expanded portion, the cylindrical mold portion being hot melted together with the insulating covering sections at both sides between which the intermediate core wire exposed portion is interposed.

2. The waterproofing structure in the core wire according to claim 1, wherein the core wires in the core wire bundle expanded portion are twisted.

3. A waterproofing method in a core wire, comprising:

removing a part of an insulating covering of a covered electric wire in which a plurality of core wires is covered with the insulating covering, thereby forming an intermediate core wire exposed portion;

fixing the covered electric wire at one end side and twisting the covered electric wire at another end side in a first direction and returning the covered electric wire in a second direction opposite to the first direction to separate the bundled core wires from each other and to expand the diameter of the bundled core wires, thereby forming a core wire bundle expanded portion, wherein the intermediate core wire exposed portion is interposed between the covered electric wire at the one end side and the other end side;

setting the core wire bundle expanded portion together with the insulating coverings at both sides, between which the core wire bundle expanded portion is interposed; and after setting the core wire bundle expanded portion together with the insulating coverings, pouring a hot-molten thermoplastic adhesive into a molding metal mold and filling with the thermoplastic adhesive in a gap between the core wires in the core wire bundle expanded portion, thereby molding a cylindrical mold portion surrounding the core wire bundle expanded portion, together with the insulating coverings at both sides between which the core wire bundle expanded portion is interposed.

* * * * *